Sept. 3, 1957 E. PENKALA 2,805,106
DOUBLE EXTENSION SLIDES
Filed Dec. 27, 1954 2 Sheets-Sheet 1

Inventor
Emil Penkala
by Pierce, Scheffler & Parker
atty's

Sept. 3, 1957　　　　　　E. PENKALA　　　　　2,805,106
DOUBLE EXTENSION SLIDES

Filed Dec. 27, 1954　　　　　　　　　　　　2 Sheets-Sheet 2

Inventor
Emil Penkala
by Pierce, Scheffler & Parker
attys

United States Patent Office 2,805,106
Patented Sept. 3, 1957

2,805,106

DOUBLE EXTENSION SLIDES

Emil Penkala, London, England, assignor of one-half to Metal Trim Limited, Irvine, Ayrshire, Scotland Application December 27, 1954, Serial No. 477,885

6 Claims. (Cl. 308—3.8)

This invention relates to double extension slides for the slidable support of drawers of filing cabinets or similar purposes, and is particularly concerned with improvements in double extension slides of the progressive type in which anti-friction elements, such as balls or rollers rotatable about a fixed axis on an intermediate slide element, frictionally engage inner and outer slide elements so that as the slide is extended or retracted, the intermediate element is caused to move progressively at half the speed of the inner slide element.

Double extension slides in which the movement of the intermediate slide element is not definitely related to the movement of the inner slide element, have the disadvantage that they are relatively noisy in operation due to the impact of co-operating stops on the slide elements when movement is transmitted by the stops from one slide element to the other when opening or closing the slide. Furthermore, uniform distribution of the load on the slide throughout the opening and closing movement is not attainable.

In double extension slides of the progressive type, as hereinafter proposed, the anti-friction elements associated with the intermediate slide element and frictionally engaging the inner and outer slide elements for obtaining the progressive action, are usually arranged at the bottom of the intermediate slide element and form part of the load-carrying assembly. For example, in one construction balls are located in openings spaced longitudinally in a lower flange of the inner slide element and frictionally engage opposed flanges of the inner and outer slide elements. In such constructions the progressive action of the slide is dependent on continuity of the applied load. If the load is insufficient, or if, in the opening or closing movement, a lifting force should be applied, the smooth progressive action may be upset.

The present invention has for its object to provide an improved construction of double extension slide of the progressive type wherein the progressive action is independent of the load and wherein the means for obtaining the progressive action also serves for taking up slack between tracks and anti-friction elements to achieve a higher degree of quietness and smoothness in operation.

According to the present invention, a double extension slide of the progressive type comprises inner, outer and intermediate slide elements slidable in relation to one another on load-carrying anti-friction elements, such as balls, rollers or the like, and additional balls or rollers located in openings in a web portion of the intermediate element and frictionally engaging laterally opposed surfaces of slide elements at opposite sides of the intermediate element, one of said opposed surfaces being provided by a resilient element mounted on the respective slide element and exerting lateral pressure to maintain frictional engagement between said opposed surface and said additional balls or rollers independently of the load on the slide. Preferably the resilient element is mounted on the inner slide element and the laterally opposed surface is provided by a web portion of the outer slide element.

In a preferred embodiment, the slide elements are provided with upper and lower flanges formed to provide grooved tracks for engaging interposed load-carrying balls, the flanges of the intermediate element being shaped to provide tracks at the outer side opposed to the tracks of the outer element, and tracks at the inner side opposed to the tracks of the inner element and offset outwardly from the web of the outer slide element with respect to the opposed tracks of the intermediate and outer elements, the additional balls or rollers being located in openings provided in the web portion of the intermediate slide element at substantially the same level as the load-carrying balls between the inner and intermediate slide elements, and wherein the resilient element is in the form of a spring metal strip carried by the inner slide element and having longitudinal marginal portions or flanges projecting between said additional balls and rollers and the load-carrying balls between the inner and intermediate slide elements and acting to press said additional balls or rollers into frictional engagement with the web portion of the outer slide element.

The invention is particularly applicable to a double-acting slide in which the slide elements are provided with stop means according to prior U. S. Patent No. 2,692,170, in which case the resilient element may be located within the inner slide element by the double-acting stop thereon.

According to a further feature of the invention, the rear end of the intermediate slide element may be supported on a roller journalled on the intermediate element and running on the lower flange of the outer slide element, and said lower flange of the outer slide element is cut away, bent downwards or recessed at its rear end so that during the latter part of the closing movement of the slide, load on the slide acting through said journalled roller gives an automatic draw-in action to complete the closing movement. The intermediate slide element may be provided with spaced stops according to prior U. S. Patent No. 2,692,170, each of said spaced stops comprising a U-shaped sheet metal member insertable through an enlarged opening in the web of the intermediate slide element and having the limbs formed with slots to engage a transverse portion of the web between said enlarged opening and a second opening spaced therefrom longitudinally of the slide element, and projecting fingers on said elements at one side of the slots therein, said fingers being adapted to be bent up into said second opening to locate the sheet metal member in position with a horizontally disposed U-shaped part projecting at each side of the said web.

The invention is hereinafter described, by way of example, with reference to the accompanying diagrammatic drawing, in which.

Figure 3:
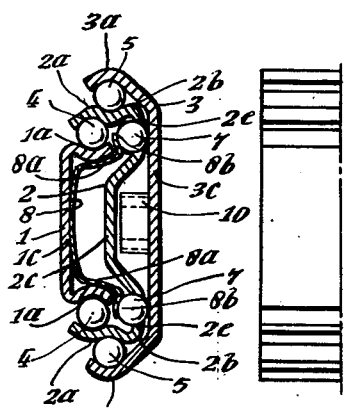
Fig. 3 is a section of the line 3—3 of Fig. 2.

In carrying the invention into effect according to one embodiment, and as illustrated in the accompanying diagrammatic drawing, a double extension slide comprises inner, intermediate and outer slide elements 1, 2, 3 respectively having upper and lower flanges 1a, 2a, 3a shaped to provide opposed grooved tracks for co-operation with load-carrying balls 4, 5 the balls 4 engaging between opposed tracks on the inner and intermediate members 1, 2 and the balls 5 between opposed tracks on the intermediate and outer elements 2, 3.

Figure 1:
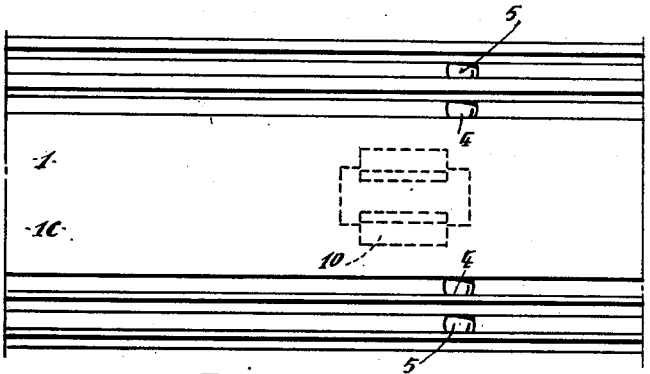
Fig. 1 is a side elevation of the left portion of a preferred construction of double extension slide according to the invention.
Figure 4:
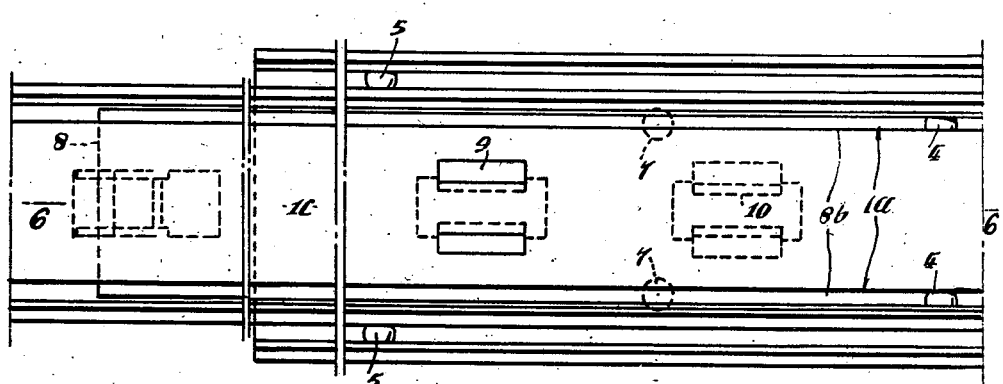
Fig. 4 is a view similar to Fig. 1 showing the left portion of the double extension slide when the slide is partly extended.
Figure 2:
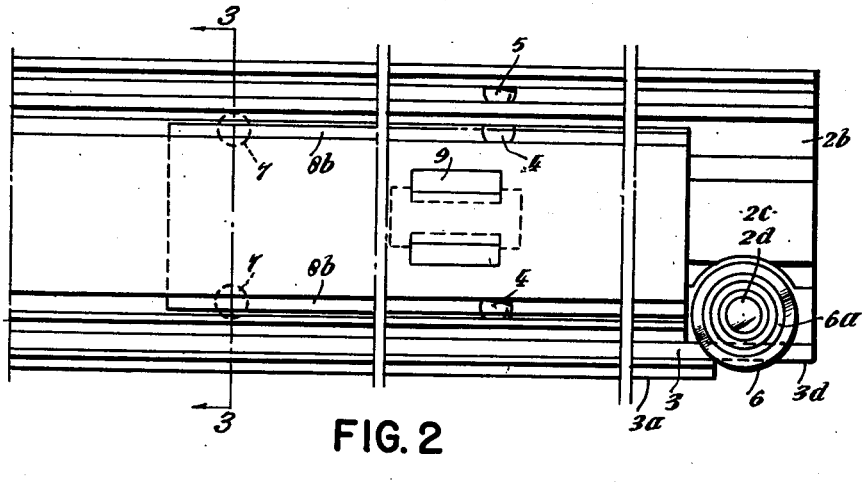
Fig. 2 is a continuation of Fig. 1 showing the right portion of the double extension slide.

Referring particularly to Fig. 3, it will be seen that the flanges 2a of the intermediate element 2 are shaped to provide grooved tracks at the outer side opposed to the grooved tracks of the outer slide element, and grooved tracks at the inner side opposed to the grooved tracks of the inner slide element, the arrangement being such that the opposed grooves of the inner and intermediate slide elements are offset outwardly away from the web 3c of the outer slide element 3 with respect to the opposed tracks of the intermediate and outer elements. This arrangement provides spaces between the balls 4 and the web 3c of the outer slide element for the purpose hereinafter referred to. As shown particularly in Figs. 1, 2 and 3, the rear end of the intermediate slide element is supported on the lower flange 3a of the outer slide element by a roller 6 journalled on a ball bearing 6a mounted on a stub axle 2d fixed to the intermediate slide element 2. At the rear end the flange 3a is cut away as at 3d, or bent downwards or recessed so that towards the end of the closing movement of the slide, the roller 6 rides off the flange 3a so as to impart a draw-in movement to the slide due to the load thereon so that complete closing of a drawer or the like carried by the slide is effected automatically. As the inner slide element 1 moves twice the distance travelled by the intermediate slide element 2, a relatively small draw-in movement of the intermediate slide element by the action of the roller 6 will correspond to a magnified draw-in movement of the inner slide element.

In the spaces between the upper and lower balls 4 and the web 3c of the outer slide element 3, additional balls 7 are located in holes 2e in web portions 2b of the intermediate slide element 2, the balls 7, which are on substantially the same level as the balls 4, frictionally engaging laterally opposed surfaces, one provided by the web 3c of the outer slide element 3, and the other by a longitudinal marginal portion or flange 8b extending outwardly from opposite walls 8a of a spring metal strip 8 which seats within the inner slide element 1 and is fixedly located in relation thereto by the provision of a central aperture in the metal strip 8 coacting with a double-acting stop 9 fixed to the inner slide element 1. The spring metal strip 8 is initially of such cross-sectional shape that when the slide is assembled the marginal portions or flanges 8b press against the balls 7 with sufficient pressure to ensure effective frictional engagement for causing progressive movement of the intermediate slide element 2 in relation to the inner slide element 1. Furthermore, the laterally directed pressure of the spring metal strip 8 maintains an outward pressure on the inner slide element 1 which takes up any slack between the balls 4, 5 and their respective tracks with the result that the improved slide is much smoother and quieter in action than other double extension slides.

Figure 6:
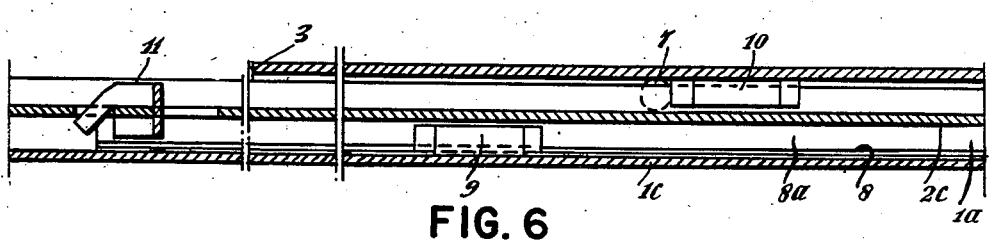
Fig. 6 is a sectional view through line 6—6 of Fig. 4.
Figure 5:
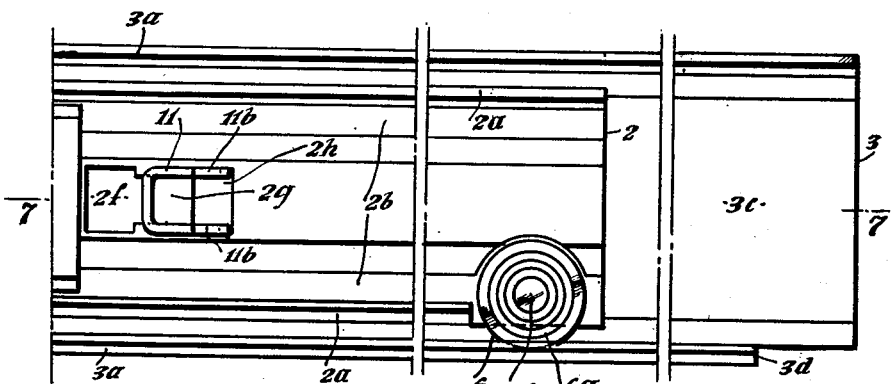
Fig. 5 is a continuation of Fig. 4 showing the right portion of the slide.
Figure 7:
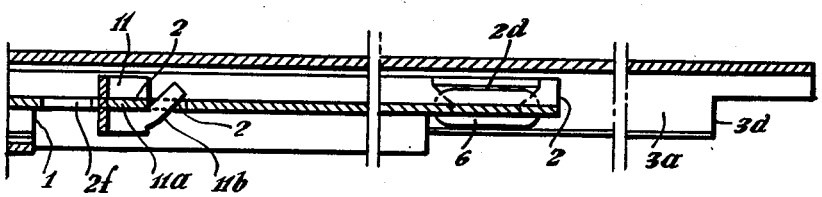
Fig. 7 is a sectional view through line 7—7 of Fig. 5 and a continuation of Fig. 6.

The improved double extension slide preferably is provided with stop means according to U. S. Patent #2,692,170, the intermediate slide element 2 being provided with longitudinally spaced stops 11 which coact with the double-acting stop 9 on the inner slide element 1 and also with a double-acting stop 10 on the outer side element 3. As shown particularly in Figs. 5, 6 and 7, each stop 11 may comprise a U-shaped sheet metal member insertable through an enlarged opening 2f in the web 2c of the intermediate slide element 2 and having the limbs formed with slots 11a (Fig. 7) to engage a transverse portion 2g of the web 2c between said enlarged opening 2f and a second opening 2h, the limbs of the U-shaped stop 11 having projecting fingers 11b at one side of the slots therein, the fingers 11b being adapted to be bent up into the said second opening 2h so as to locate the stop 11 in position with a horizontally disposed U-shaped part projecting at each side of the web 2c for co-operation with the respective double-acting stops.

It will be understood that the invention is not limited to the particular embodiment hereinbefore described. For example, the tracks of the respective slide elements may be modified to coact with rollers, instead of balls, and the form and arrangement of the respective slide elements may be modified in various ways. For instance, the inner slide element may be formed with flanges to provide one of the laterally opposed surfaces for engagement with the balls 7, the spring metal strip 8 being mounted on the outer slide element.

What I claim is:

1. A double extension slide of the progressive type comprising inner, outer and intermediate slide elements slidable in relation to one another on load-carrying antifriction rolling elements, such as balls, rollers or the like, and additional rolling elements located in openings in a web portion of the intermediate element and frictionally engaging laterally opposed surfaces of slide elements at opposite sides of the intermediate element, one of said opposed surfaces being provided by a resilient element mounted on the respective slide element and exerting lateral pressure to maintain frictional engagement between said opposed surface and said additional rolling elements independently of the load on the slide.

2. A double extension slide according to claim 1, wherein the resilient element is mounted on the inner slide element and the laterally opposed surface is provided by a web portion of the outer slide element.

3. A double extension slide according to claim 1, wherein the slide elements are provided with upper and lower flanges formed to provide grooved tracks for engaging interposed load-carrying rolling elements, the flanges of the intermediate slide element being shaped to provide tracks at the outer side opposed to tracks of the outer slide element and tracks at the inner side opposed to the tracks of the inner slide element and offset outwardly from the web of the outer slide element with respect to the opposed tracks of the intermediate and outer elements, the additional rolling elements being located in openings provided in the web portion of the intermediate slide element at substantially the same level as the load-carrying rolling elements between the inner and intermediate slide elements, and wherein a resilient element is in the form of a spring metal strip carried by the inner slide element and having longitudinal marginal portions or flanges projecting between said additional rolling elements and the load-carrying rolling elements between the inner and intermediate slide elements and acting to press said additional rolling elements into frictional engagement with the web portion of the outer slide element.

4. A double extension slide according to claim 3, wherein the rear end of the intermediate slide element is supported on a roller journalled on the intermediate element and running on the lower flange of the outer slide element, and said lower flange of the outer slide element is cut away, bent downwards or recessed at its rear end so that during the latter part of the closing movement of the slide, load on the slide acting through said journalled roller gives an automatic draw-in action to complete the closing movement.

5. A double extension slide according to claim 1, wherein the inner slide element is provided with a single double-acting stop cooperating with spaced stops on the intermediate slide element and the resilient element is located within the inner slide element by said double-acting stop.

6. A double extension slide according to claim 1, wherein the intermediate slide element is provided with spaced stops projecting at each side thereof for co-operation with double-acting stops on the inner and outer slide elements, characterised in that each stop on the intermediate slide element comprises a U-shaped sheet metal member insertable through an enlarged opening in the web of the intermediate slide element and having the limbs formed with slots to engage a transverse portion of the web between said enlarged opening and a second opening spaced therefrom longitudinally of the slide element, and projecting fingers on said element at one side of the slots therein, said fingers being adapted to be bent up into said second opening to locate the sheet metal member in position with a horizontally disposed U-shaped part projecting at each side of the said web.

References Cited in the file of this patent

UNITED STATES PATENTS

| | | |
|---|---|---|
| 2,561,163 | Wolters | July 17, 1951 |
| 2,671,699 | Vignos | Mar. 9, 1954 |
| 2,692,170 | Penkala | Oct. 19, 1954 |